US012786489B2

(12) United States Patent
Yang et al.

(10) Patent No.: US 12,786,489 B2
(45) Date of Patent: Nov. 3, 2026

(54) INSERTION METHOD FOR INSERTING A PROMOTION FILE WHILE PLAYING A MEDIA FILE AND MEDIUM AND ELECTRONIC DEVICE IMPLEMENTING SAME

(71) Applicant: Beijing Youzhuju Network Technology Co., Ltd., Beijing (CN)

(72) Inventors: Xiao Yang, Beijing (CN); Chenglong Li, Beijing (CN); Xiaowei Li, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/953,331

(22) Filed: Nov. 20, 2024

(65) Prior Publication Data

US 2025/0168422 A1 May 22, 2025

(30) Foreign Application Priority Data

Nov. 20, 2023 (CN) ......................... 202311553455.1

(51) Int. Cl.
*H04N 21/234* (2011.01)
*H04N 21/262* (2011.01)
*H04N 21/81* (2011.01)

(52) U.S. Cl.
CPC . *H04N 21/23424* (2013.01); *H04N 21/26241* (2013.01); *H04N 21/812* (2013.01)

(58) Field of Classification Search
CPC ....... H04N 21/23424; H04N 21/26241; H04N 21/812; H04N 21/26258; H04N 21/26283;
(Continued)

(56) References Cited

U.S. PATENT DOCUMENTS

2004/0003398 A1 1/2004 Donian et al.
2006/0287915 A1* 12/2006 Boulet ............... G06Q 30/0269
348/E7.071
(Continued)

FOREIGN PATENT DOCUMENTS

CN 103297840 A 9/2013
CN 111815363 A 10/2020
(Continued)

OTHER PUBLICATIONS

European Patent Office, Extended European Search Report Issued in Application No. 24214041.6, Apr. 4, 2025, Germany, 11 pages.
(Continued)

*Primary Examiner* — Gigi L Dubasky
(74) *Attorney, Agent, or Firm* — Alleman Hall LLP

(57) ABSTRACT

An insertion method is provided. The method includes: initiating a data request in response to determining that a request moment is reached in a process of playing a target media file, wherein the data request is used for obtaining a target promotion file; obtaining a target request sequence and a display moment of the target promotion file in response to the target promotion file being successfully obtained, wherein the target request sequence includes a plurality of target moments arranged in time order, the plurality of target moments include a first target moment and a second target moment; and inserting and playing the target promotion file in the process of playing the target media file based on the display moment of the target promotion file.

15 Claims, 7 Drawing Sheets

(58) Field of Classification Search
CPC ........... H04N 21/44204; H04N 21/454; H04N 21/458; G06Q 30/0254; G06Q 30/0277; G06Q 30/0272
See application file for complete search history.

(56) References Cited

U.S. PATENT DOCUMENTS

| | | | | |
|---|---|---|---|---|
| 2018/0114248 | A1* | 4/2018 | Wilkens | G06Q 30/0275 |
| 2021/0272155 | A1* | 9/2021 | Izrailev | G06Q 30/0261 |
| 2022/0036399 | A1* | 2/2022 | Grover | G06Q 30/0243 |

FOREIGN PATENT DOCUMENTS

| | | | |
|---|---|---|---|
| CN | 112418923 | A | 2/2021 |
| CN | 114554271 | A | 5/2022 |
| CN | 114511359 | B | 11/2022 |
| CN | 116151889 | A | 5/2023 |
| CN | 116523573 | A | 8/2023 |

OTHER PUBLICATIONS

China National Intellectual Property Administration, Office Action and Search Report Issued in Application No. 202311553455.1, Mar. 19, 2026, 18 pages.

* cited by examiner

INSERTION METHOD FOR INSERTING A PROMOTION FILE WHILE PLAYING A MEDIA FILE AND MEDIUM AND ELECTRONIC DEVICE IMPLEMENTING SAME

CROSS-REFERENCE TO RELATED APPLICATION

This application claims priority to Chinese Patent Application No. 202311553455.1, filed on Nov. 20, 2023, which is incorporated herein by reference in its entirety as a part of this application.

TECHNICAL FIELD

The present disclosure relates to an insertion method and apparatus, a medium, and an electronic device.

BACKGROUND

In multimedia websites of the Internet, advertisements are usually inserted in the process of playing videos. In the related art, moments for requesting advertisements throughout the process of playing a video are generally estimated based on the playback progress of the video, and the advertisements are inserted when the advertisements are requested. In this process, the moments for requesting the advertisements are independent of each other, which cannot bring a maximum effective conversion of the advertisements, thereby wasting resources consumed by the advertisement insertion. In addition, due to the complexity of the system architecture for implementing advertisement break during video playback, it may be necessary to obtain an advertisement repeatedly when the advertisement is not successfully requested at one time, which delays the playback time of the advertisement. If advertisements are still requested based on the previously estimated moments for requesting the advertisements, this may result in, for example, a plurality of advertisement breaks within a short time, affecting the user experience.

SUMMARY

The Summary is provided to give a brief overview of concepts, which will be described in detail later in the Detailed Description section. The Summary is neither intended to identify key or necessary features of the claimed technical solutions, nor is it intended to be used to limit the scope of the claimed technical solutions.

According to a first aspect, the present disclosure provides an insertion method. The method includes:

initiating a data request in response to determining that a request moment is reached in a process of playing a target media file, wherein the data request is used for obtaining a target promotion file;

obtaining a target request sequence and a display moment of the target promotion file in response to the target promotion file being successfully obtained, wherein the target request sequence includes a plurality of target moments arranged in time order, the plurality of target moments include a first target moment and a second target moment, the first target moment is used for representing a request moment at which the target promotion file is successfully requested, the second target moment is used for representing an estimated request moment for requesting other target promotion file for the first time after the target promotion file is successfully obtained this time, and the target request sequence is a candidate sequence with a highest promotional value among at least one candidate sequence that satisfies a user experience constraint; and inserting and playing the target promotion file in the process of playing the target media file based on the display moment of the target promotion file.

According to a second aspect, the present disclosure provides an insertion apparatus. The apparatus includes:

an initiation module configured to initiate a data request in response to determining that a request moment is reached in a process of playing a target media file, wherein the data request is used for obtaining a target promotion file;

an obtaining module configured to obtain a target request sequence and a display moment of the target promotion file in response to the target promotion file being successfully obtained, wherein the target request sequence comprises a plurality of target moments arranged in time order, the plurality of target moments comprise a first target moment and a second target moment, the first target moment is used for representing a request moment at which the target promotion file is successfully requested, the second target moment is used for representing an estimated request moment for requesting other target promotion file for the first time after the target promotion file is successfully obtained this time, and the target request sequence is a candidate sequence with a highest promotional value among at least one candidate sequence that satisfies a user experience constraint; and an insertion module configured to insert and play the target promotion file in the process of playing the target media file based on the display moment of the target promotion file.

According to a third aspect, the present disclosure provides a computer-readable medium having a computer program stored thereon, where the program, when executed by a processing apparatus, causes the steps of the method according to the first aspect to be implemented.

According to a fourth aspect, the present disclosure provides an electronic device. The electronic device includes:

a storage apparatus having a computer program stored thereon; and a processing apparatus configured to execute the computer program in the storage apparatus to implement the steps of the method according to the first aspect.

The other features and advantages of the present disclosure will be described in detail in the following Detailed Description section.

BRIEF DESCRIPTION OF DRAWINGS

The above and other features, advantages, and aspects of the embodiments of the present disclosure will become more apparent in conjunction with the accompanying drawings and with reference to the following specific embodiments. Throughout the accompanying drawings, identical or similar reference numerals denote identical or similar elements. It should be understood that the accompanying drawings are schematic and that parts and elements are not necessarily drawn to scale. In the accompanying drawings.

DETAILED DESCRIPTION

Figure 1:
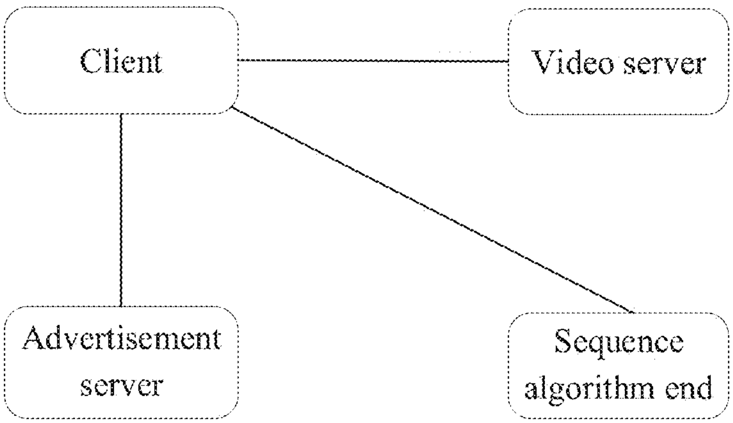
FIG. 1 is a schematic architecture diagram of a system according to an exemplary embodiment of the present disclosure.

The embodiments of the present disclosure are described in more detail below with reference to the accompanying drawings. Although some embodiments of the present disclosure are shown in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and the embodiments of the present disclosure are only for exemplary purposes, and are not intended to limit the scope of protection of the present disclosure.

It should be understood that the various steps described in the method implementations of the present disclosure may be performed in different orders, and/or performed in parallel. Furthermore, additional steps may be included and/or the execution of the illustrated steps may be omitted in the method implementations. The scope of the present disclosure is not limited in this respect.

The term "include" used herein and the variations thereof are an open-ended inclusion, namely, "include but not limited to". The term "based on" is "at least partially based on". The term "an embodiment" means "at least one embodiment". The term "another embodiment" means "at least one another embodiment". The term "some embodiments" means "at least some embodiments". Related definitions of the other terms will be given in the description below.

It should be noted that concepts such as "first" and "second" mentioned in the present disclosure are only used to distinguish different apparatuses, modules, or units, and are not used to limit the sequence of functions performed by these apparatuses, modules, or units or interdependence.

It should be noted that the modifiers "one" and "a plurality of" mentioned in the present disclosure are illustrative and not restrictive, and those skilled in the art should understand that unless the context clearly indicates otherwise, the modifiers should be understood as "one or more".

The names of messages or information exchanged between a plurality of apparatuses in the implementations of the present disclosure are used for illustrative purposes only, and are not used to limit the scope of these messages or information.

It can be understood that before the use of the technical solutions disclosed in the embodiments of the present disclosure, the user shall be informed of the type, range of use, use scenarios, etc., of personal information involved in the present disclosure in an appropriate manner in accordance with the relevant laws and regulations, and the authorization of the user shall be obtained.

For example, in response to the reception of an active request from the user, prompt information is sent to the user to clearly inform the user that a requested operation will require access to and use of the personal information of the user. As such, the user can independently choose, based on the prompt information, whether to provide the personal information to software or hardware, such as an electronic device, an application, a server, or a storage medium, that performs operations in the technical solutions of the present disclosure.

As an optional but non-limiting implementation, in response to the reception of the active request from the user, the prompt information may be sent to the user in the form of, for example, a pop-up window, in which the prompt information may be presented in the text. Furthermore, the pop-up window may also include a selection control for the user to choose whether to "agree" or "disagree" to provide personal information to the electronic device.

It can be understood that the above process of notifying and obtaining the authorization of the user is only illustrative and does not constitute a limitation on the implementations of the present disclosure, and other manners that satisfy the relevant laws and regulations may also be applied in the implementations of the present disclosure.

Furthermore, it can be understood that the data involved in the technical solutions (including, but not limited to, the data itself and the access to or use of the data) shall comply with the requirements of corresponding laws, regulations, and relevant provisions.

The embodiments of the present disclosure will be further explained and described with reference to the accompanying drawings. Specifically, the embodiments of the present disclosure are further explained and described using an example in which a target media file is a video and a target promotion file is an advertisement.

FIG. 1 is a schematic architecture diagram of a system according to an exemplary embodiment of the present disclosure. The system may include a client, a video server, an advertisement server, and a sequence algorithm end. The client is configured to display an advertisement and a video, and the client obtains content-understanding information corresponding to the video from the video server. In the process of playing the video, the client requests an advertisement from the advertisement server when a request moment arrives, and the advertisement server successfully returns the advertisement to the client. The client calls an algorithm package provided by the sequence algorithm end to determine a target request sequence and a display moment of the requested advertisement. The client inserts the advertisement in the process of playing the video, based on the display moment of the advertisement. In addition, when the next request moment arrives, the client continues to request an advertisement from the advertisement server based on the target request sequence, until advertisements have been requested for all request moments in the determined target request sequence, thereby implementing advertisement insertion in the video playback process.

Figure 2:
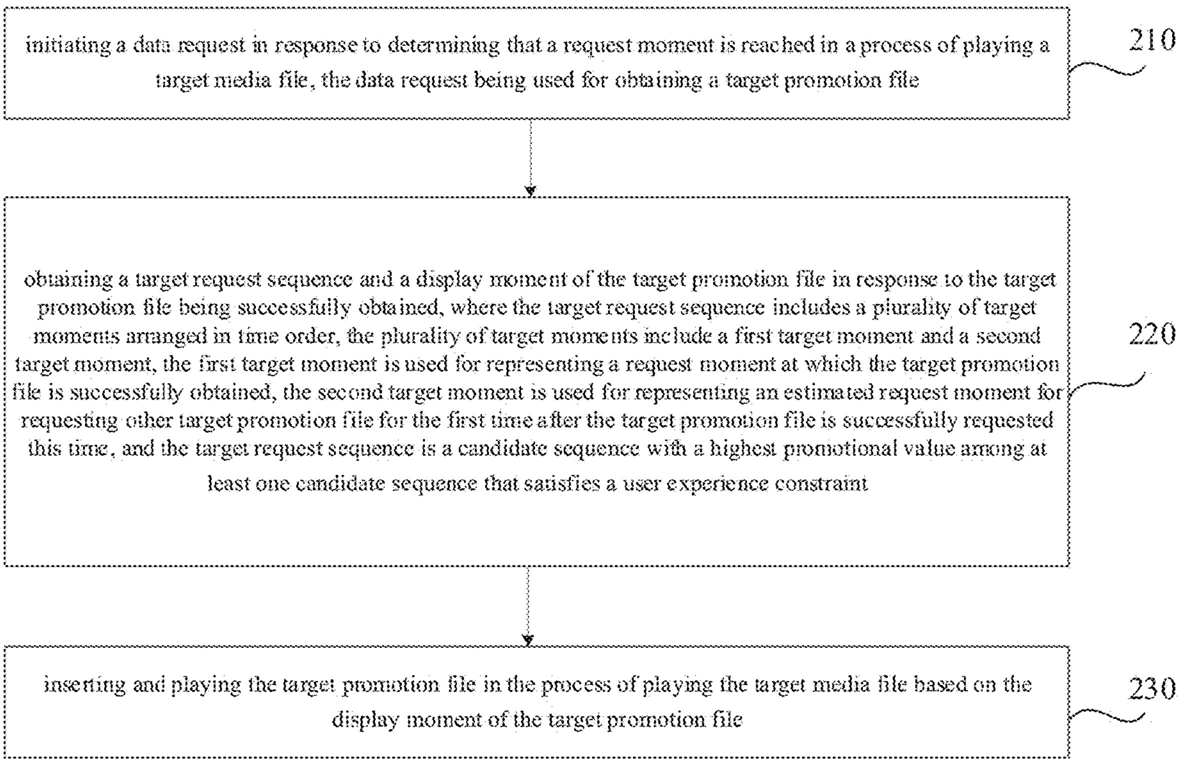
FIG. 2 is a flowchart of an insertion method according to an exemplary embodiment of the present disclosure.

FIG. 2 is a flowchart of an insertion method according to an exemplary embodiment of the present disclosure. The insertion method may be performed by an electronic device, which may be, for example, the client described above; or the electronic device may be performed by an insertion apparatus, which may be implemented by software and/or hardware. The insertion method may be implemented to insert the target promotion file in the target media file. Referring to FIG. 2, the insertion method may include the following steps.

Step 210: initiating a data request in response to determining that a request moment is reached in a process of playing a target media file, the data request being used for obtaining a target promotion file.

As can be seen from the above, the target media file may be, for example, a video, and the target promotion file may be, for example, an advertisement. For example, the insertion method may be used to insert the advertisement into the video.

The target media file may be a mid-form/long-form video. To be specific, the mid-form video may be a video of a time length greater than a first time length, or the long-form video may be a video of a time length greater than a second time length, where the first time length is less than the second time length.

It is worth noting that a request moment corresponding to a target promotion advertisement that is first inserted is determined based on the playing progress of the target media file, and the request moment herein is specifically the request moment for requesting the first inserted target promotion advertisement. A request moment corresponding to a target promotion advertisement that is not the first inserted advertisement is determined based on the latest obtained target request sequence.

It is worth noting that, it can be seen from the above architecture diagram of the system that the whole system for implementing the insertion method is complex. Since not all data requests sent by the client to the advertisement server can be successfully responded to, a plurality of re-requests may be sent, i.e., for the same advertisement, a plurality of request moments may be involved. Therefore, the request moment may include a first request moment and a second request moment, which may be understood as different types of request moments. The first request moment is the first request moment for requesting each target promotion file (e.g., the first request moment is a first one in a time order of one or more request moments), and the second request moment is a non-first request moment for requesting each target promotion file, i.e., the second request moment is a moment for initiating a re-request. As an example, the second request moment may be a corresponding moment that occurs every first preset duration with the first request moment as a start moment.

Figure 3:
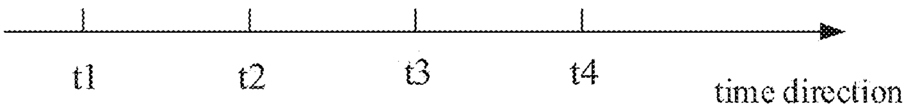
FIG. 3 is a schematic diagram of a request moment according to an exemplary embodiment of the present disclosure.

FIG. 3 is a schematic diagram of a request moment according to an exemplary embodiment of the present disclosure. Referring to the example shown in FIG. 3, t1 is a first request moment, and t2, t3, and t4 are all corresponding moments that occur every first preset duration with the first request moment as the start moment, i.e., t2, t3, and t4 are all second request moments. t1, t2, t3, and t4 are all used for requesting the same target promotion file, the time lengths between t1 and t2, t2 and t3, and t3 and t4 are the same, and the time lengths are the first preset duration.

As can be seen from the above, in the process of playing the target media file, the first request moment for requesting the first advertisement is pre-configured based on the playback progress of the video, rather than determined by the target request sequence. As an example, a corresponding moment when the playback duration of the target media file reaches a fixed duration may be determined as the first request moment for the advertisement that is first inserted.

As can be seen from the above, when the request moment includes the first request moment and the second request moment, step 210 may include: initiating the data request in response to determining that the first request moment is reached; and initiating the data request in response to arriving at the second request moment and the target promotion file being still not successfully obtained, until the target promotion file is successfully requested.

For the first advertisement inserted in the video, when the playback duration of the target media file reaches the fixed duration, it is determined that the first request moment arrives, and then the data request is initiated. For a non-first advertisement inserted in the video, when a second target moment in the obtained target request sequence arrives, it is determined that the first request moment arrives, and then the data request is initiated.

For the first advertisement inserted in the video, the data request is sent again to re-obtain the target promotion file, in response to the target promotion file still not successfully obtained for the data request sent at the corresponding first request moment when the second request moment arrives.

Continuing with the example shown in FIG. 3, it is determined that the first request moment is reached when arrives at t1, and the data request is initiated when arrives at t1. It is determined that the second request moment is reached when arrives at t2, and it is determined to send the data request again when arrives at t2 and the target promotion file is still not successfully obtained for the data request corresponding to t1. It is determined that the second request moment is reached when arrives at t3, and it is determined to send the data request again when arrives at t3 and the target promotion file is still not successfully obtained for the data request corresponding to t2.

Step 220: obtaining a target request sequence and a display moment of the target promotion file in response to the target promotion file being successfully obtained, where the target request sequence includes a plurality of target moments arranged in time order, the plurality of target moments include a first target moment and a second target moment, the first target moment is used for representing a request moment at which the target promotion file is successfully obtained, the second target moment is used for representing an estimated request moment for requesting other target promotion file for the first time after the target promotion file is successfully requested this time, and the target request sequence is a candidate sequence with a highest promotional value among at least one candidate sequence that satisfies a user experience constraint.

The number of target moments in the target request sequence may be set according to actual situations.

As an example, the display moment of the target promotion file may be a corresponding moment when the moment at which the target promotion file is successfully obtained is extended by a second preset duration.

Figure 4:
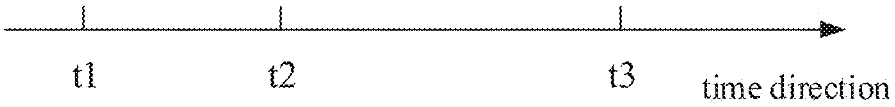
FIG. 4 is a schematic diagram of a plurality of target moments in a target request sequence according to an exemplary embodiment of the present disclosure.

FIG. 4 is a schematic diagram of a plurality of target moments in a target request sequence according to an exemplary embodiment of the present disclosure. Referring to FIG. 4, t1 may be used as the first target moment, and t2 and t3 may be used as the second target moments. It can be understood that t1 is a corresponding request moment at which the target promotion file has been successfully requested, and the request moment may be either the first request moment corresponding to the target promotion file or the second request moment corresponding to the target promotion file. t2 and t3 are estimated request moments for requesting other target promotion files for the first time after the target promotion file is successfully obtained at the moment t1. That is, it can be understood that t2 and t3 are used as the first request moments for further obtaining other target promotion files in the future after t1. Further, in the target request sequence, t2 and t3 can only be used as the first request moments.

As an example, the user experience constraint may be a constraint that a time difference between two consecutive advertisements viewed by a user is greater than a preset difference.

It is worth noting that there may be a plurality of candidate sequences that meet the user experience constraint, and therefore, the candidate sequence with the greatest promotional value may be selected as the target request sequence. The promotional value may be represented by a score of the expected revenue of the advertisements, a score of the user interrupting the playback of the target media file, and a score of user viewing experience. The score of the expected revenue of the advertisements can reflect a probability of conversion of the advertisements by users.

For the specific implementation of obtaining the target request sequence, reference can be made to the related embodiments as described below, and details are not described herein in this embodiment.

It is worth noting that, each time the target request sequence is obtained, the step of determining whether the request moment arrives the next time in the process of playing the target media file needs to be performed based on the newly obtained target request sequence.

Step 230: inserting and playing the target promotion file in the process of playing the target media file based on the display moment of the target promotion file.

For example, a start frame for inserting the target promotion file in the target media file is determined based on the display moment, and the target promotion file is inserted when the target media file is played to the start frame.

It can be understood that the playback of the target media file may be resumed from the start frame of the target promotion file after the playback of the target promotion file has ended.

With the above technical solution, the request moments for requesting the target promotion files in the target request sequence are not independent of each other, but are a combination of a plurality of request moments with the highest promotional values in the candidate sequence that meets the user experience constraint. In addition, based on the promotional value of the entire target request sequence including the request moment at which the target promotion file has been successfully requested and the estimated request moments for requesting other target promotion files for the first time after the target promotion file is successfully requested this time, the target promotion file is inserted in the target media file, which facilitates an effective conversion of the target promotion file, thereby avoiding wasting resources consumed by advertisement insertion. Moreover, the target request sequence meets the user experience constraint, which facilitates an improvement in the user experience.

In some embodiments, the step of obtaining the target request sequence may be implemented by: generating the at least one candidate sequence that satisfies the user experience constraint, with each candidate sequence including at least the first target moment, wherein the user experience constraint includes that a time difference between any two initial candidate moments in a candidate sequence is greater than a first preset difference, and/or that a difference between the first unreached second target moment in the candidate sequence and the display moment is greater than a second preset difference; determining a promotional value of each candidate sequence; and determining the candidate sequence with the highest promotional value as the target request sequence.

As can be seen from the above, since not all data requests can be successfully responded to by returning the target promotion file, there may be a plurality of data requests for the same target promotion file. The promotional value of the candidate sequence is related to each initial candidate moment in the candidate sequence, and in order to reflect a promotional value of the candidate sequence in a real application scenario, the generated candidate sequences need to include at least the request moment at which the target promotion file has been successfully requested.

It is worth noting that the time difference between any two initial candidate moments is greater than the first preset difference, considering that each target promotion file may be successfully obtained by sending a first data request. Therefore, in order for the user to avoid viewing two consecutive target promotion files within a short time in the process of playing the target media file, the user experience constraint needs to include that the time difference between any two initial candidate moments is greater than the first preset difference. The first unreached second target moment may be understood as a first request moment for requesting the next target promotion file. The difference between the first unreached second target moment in the candidate sequence and the display moment is greater than the second preset difference, also in order for the user to avoid viewing two consecutive target promotion files within a short time in the process of playing the target media file. Therefore, the user experience constraint needs to include that the difference between the first unreached second target moment and the display moment is greater than the second preset difference.

Reference can be made to the related embodiments as described below for determining the promotional values of the candidate sequences, and details are not described herein in this embodiment.

When two consecutive advertisements are played on the client with a short time interval, the user viewing experience may be poor, affecting an effective conversion of the advertisements by users, and this is not conducive to enhancing the user's stickiness to the client. In view of this, by means of setting in the above manner, the generated candidate sequences need to satisfy the above user experience constraint to solve the problem.

In some embodiments, the candidate sequence may be generated by following steps: generating a plurality of initial candidate moments, where the plurality of initial candidate moments include at least the first target moment; determining a search range in the plurality of initial candidate moments according to a filtering rule, where the remaining initial candidate moments after filtering includes at least the first target moment; and searching for the at least one candidate sequence that satisfies the user experience constraint in the search range, where each candidate sequence includes at least the first target moment.

First, it is worth noting that in the process of generating the candidate sequence, the candidate sequence needs to be obtained with the constraint that the candidate sequence includes at least the first target moment.

The video may be segmented based on a time interval in combination with the content understanding information, so as to obtain a plurality of initial candidate moments, and the plurality of initial candidate moments include at least the first target moment.

Target initial candidate moments may be filtered out from the plurality of initial candidate moments according to the filtering rule, and the search range includes all the remaining initial candidate moments.

As an example, the filtering rule may include a first filtering rule and/or a second filtering rule. The first filtering rule is used for representing filtering out an initial candidate moment of which a first attribute value does not satisfy a corresponding condition, i.e., the initial candidate moment of which the first attribute value does not satisfy the corresponding condition may be referred to as the target initial candidate moment. The second filtering rule is used for representing filtering out any initial candidate moment in a target initial candidate moment pair, where two adjacent initial candidate moments with a time interval less than a third preset difference are the target initial candidate moment pair, i.e., any initial candidate moment in the target initial candidate moment pair may be referred to as the target initial candidate moment.

As an example, the first filtering rule may be first used to perform primary filtering, and then the second filtering rule may be used to perform secondary filtering on a filtering result obtained by the primary filtering, so as to obtain a final search range, where the final search range includes the remaining initial candidate moments after the secondary filtering.

As an example, the first attribute value may be at least one selected from the group consisting of an effective cost per mille (eCPM), an interruption rate of ending the playback of the target media file caused by inserting the target promotion file corresponding to the initial candidate moment, and a probability value of the target media file being played to the initial candidate moment. The first attribute value is related to the playback progress of the target media file. That is, considering the influence of the playback progress of the target media file on each first attribute value, the first attribute value corresponding to each initial candidate moment may be determined based on the playback progress, so as to update to obtain the first attribute value which is more in line with the actual scenario.

Figure 5:
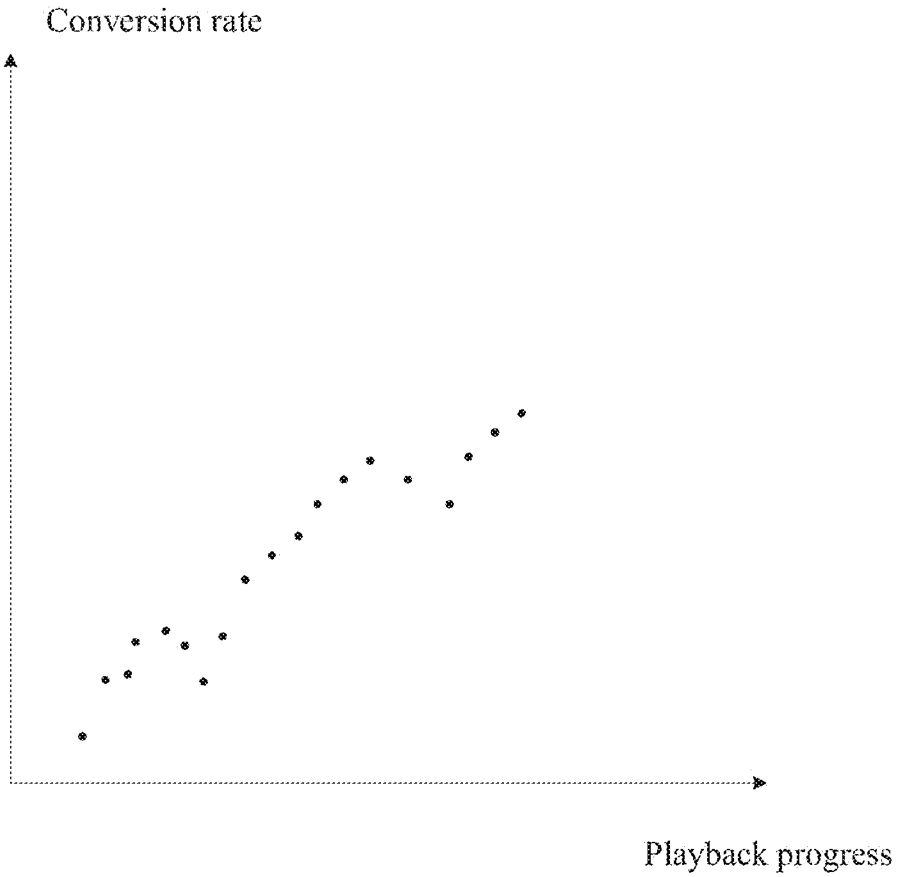
FIG. 5 is a schematic diagram showing a curvilinear relationship between a conversion rate and a playback progress according to an exemplary embodiment of the present disclosure.

An empirical value of the effective cost per mille may be a parameter corresponding to a target media advertisement and delivered by the advertisement server. On this basis, the empirical value is rectified in combination with a relationship between the conversion rate and the playback progress, so as to obtain the effective cost per mille that is more in line with the actual application scenario. FIG. 5 is a schematic diagram showing a curvilinear relationship between a conversion rate and a playback progress according to an exemplary embodiment of the present disclosure. Referring to FIG. 5, a corresponding conversion rate can be found based on a current playback progress of the target media file, and a slope is calculated based on the current playback progress and the corresponding conversion rate, such that the empirical value is rectified by using the slope.

Figure 6:
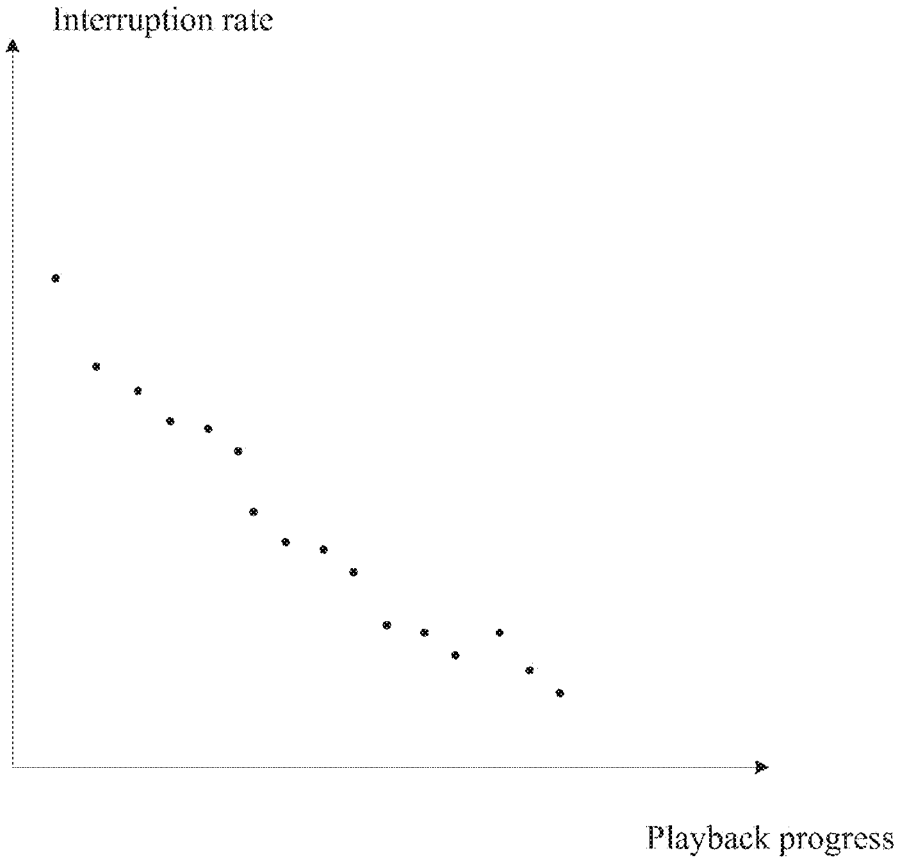
FIG. 6 is a schematic diagram showing a curvilinear relationship between an interruption rate and a playback progress according to an exemplary embodiment of the present disclosure.

An average interruption rate of users within a preset period may be calculated to obtain a corresponding empirical value. On this basis, the empirical value is rectified in combination with a relationship between the interruption rate and the playback progress, so as to obtain the interruption rate that is more in line with the actual scenario. FIG. 6 is a schematic diagram showing a curvilinear relationship between an interruption rate and playback progress according to an exemplary embodiment of the present disclosure. Referring to FIG. 6, a corresponding interruption rate can be found based on the current playback progress of the target media file, and a slope is calculated based on the current playback progress and the corresponding interruption rate, such that the empirical value is rectified by using the slope.

For each user, a model may be used to predict a stay duration of the user at the target media file, and the probability value of the target media file being played to the initial candidate moment is obtained based on the stay duration and the playback progress corresponding to the initial candidate moment.

Continuing with the above example of the first attribute value, the initial candidate moments with large eCPMs and large interruption rates may be filtered out, and the initial candidate moments with small probability values of the target media file being played to the initial candidate moments may be filtered out.

The candidate sequences that satisfy the user experience constraint may be found by using a greedy search algorithm. It is worth noting that, in order to ensure that the candidate sequence with the greatest promotional value can be obtained, when a plurality of initial candidate moments are sampled at the early stage, as many initial candidate moments as possible may be sampled. However, in order to reduce search time consuming due to a large number of initial candidate moments, the search range is reduced by using the filtering rule in the above manner. In addition, the first filtering rule is first used for filtering to retain the initial candidate moments with good attribute values as much as possible. On this basis, the second filtering rule is used for retaining one of two moments that are close and adjacent to each other, thereby achieving the purpose of reducing the search range.

In some embodiments, the step of determining a promotional value of the candidate sequence may include: obtaining a second attribute value corresponding to each initial candidate moment in each candidate sequence; and determining a promotional value corresponding to each candidate sequence based on the second attribute value corresponding to each initial candidate moment in each candidate sequence.

The second attribute value includes at least one selected from the group consisting of an effective cost per mille, an interruption rate of ending the playback of the target media file caused by inserting the target promotion file corresponding to the initial candidate moment, a probability value of the target media file being played to the initial candidate moment, and content understanding information.

Reference may be made to the related explanations in the above embodiments for the effective cost per mille, the interruption rate of ending the playback of the target media file caused by inserting the target promotion file corresponding to the initial candidate moment, and the probability value of the target media file being played to the initial candidate moment, and details are not described herein in this embodiment.

The promotional value of each candidate sequence may be determined by accumulating three scores, where the three scores may be the score of the expected revenue of the advertisement, the score of the user interrupting the playback of the target media file, and the score of user viewing experience as mentioned above, and the three scores may be determined based on the second attribute value corresponding to the initial candidate moment in each candidate sequence.

For example, the first score, i.e., the score of the expected revenue of the advertisements, may be determined by using the following formula (1):

$$E(ecpm) = ecpm_{ad1} * P(st_1) + ecpm_{ad2} * P(st_2) * (1 - P(st_1)) +, \ldots, + ecpm_{adn} * P(st_n) * (1 - P(st_{n-1})) * \ldots * (1 - P(st_1)) \quad (1)$$

In the above formula (1), E(ecpm) is the score of the expected revenue of the advertisement, n is the number of initial candidate moments in the candidate sequence,ecpm$_{ad1}$, ecpm$_{ad2}$, . . . , and ecpm$_{adh}$ are the effective costs per mille corresponding to the first initial candidate moment, the second initial candidate moment, . . . , and the n$^{th}$ initial candidate moment in the candidate sequence, respectively, and P(st$_1$), P(st$_2$), . . . , P(st$_{n-1}$), and P(st$_n$) are the probability values of playing to the corresponding initial candidate moments corresponding to the first initial candidate moment, the second initial candidate moment, . . . , the (n−1)$^{th}$ initial candidate moment, and the n$^{th}$ initial candidate moment in the candidate sequence, respectively.

The second score, i.e., the score of the user interrupting the playback of the target media file, may be determined by using the following formula (2):

$$E(br) = k_1 * (P(brt_1) + P(brt_2) * (1 - P(brt_1)) +, \ldots, + P(brt_n) * (1 - P(brt_{n-1})) *, \ldots, * (1 - P(brt_1)) \quad (2)$$

In the above formula (2), E(br) is the score of the user interrupting the playback of the target media file, $k_1$ is a suppression coefficient less than 0, n is the number of initial candidate moments in the candidate sequence, and P(brt$_1$), P(brt$_2$), . . . , P(brt$_{n-1}$), and P(brt$_n$) are the interruption rates of ending the playback of the target media file caused by inserting the target promotion files corresponding to the initial candidate moments corresponding to the first initial candidate moment, the second initial candidate moment, . . . , the (n−1)$^{th}$ initial candidate moment, and the n$^{th}$ initial candidate moment in the candidate sequence, respectively.

The third score, i.e., the score of user viewing experience, may be determined by using the following formula (3):

$$E(es) = P(est_1) + P(est_2) * (1 - P(est_1) +, \ldots, + P(est_n) * (1 - P(est_{n-1})) *, \ldots, * (1 - P(est_1)) \quad (3)$$

In the above formula (3), E(es) is the score of user viewing experience, n is the number of initial candidate moments in the candidate sequence, and P(est$_1$), P(est$_2$), . . . , P(est$_{n-1}$), and P(est$_n$) are the scores of viewing experience corresponding to the first initial candidate moment, the second initial candidate moment, . . . , the (n−1)$^{th}$ initial candidate moment, and the n$^{th}$ initial candidate moment in the candidate sequence, respectively.

It is worth noting that the score of viewing experience corresponding to each initial candidate moment is determined based on the content understanding information at the corresponding moment. For example, the content understanding information at each initial candidate moment may be used to reflect whether the initial candidate moment is a hot node, a plot turning point, a coherent movement node, a coherent sentence node, etc. As an example, if the initial candidate moment is a hot node, the score of the viewing experience corresponding to the initial candidate moment is increased, and if the initial candidate moment is a plot turning point, the score of the viewing experience corresponding to the initial candidate moment is decreased. The score of viewing experience corresponding to the initial candidate moment is determined based on all increases and decreases of the initial candidate moment.

Figure 7:
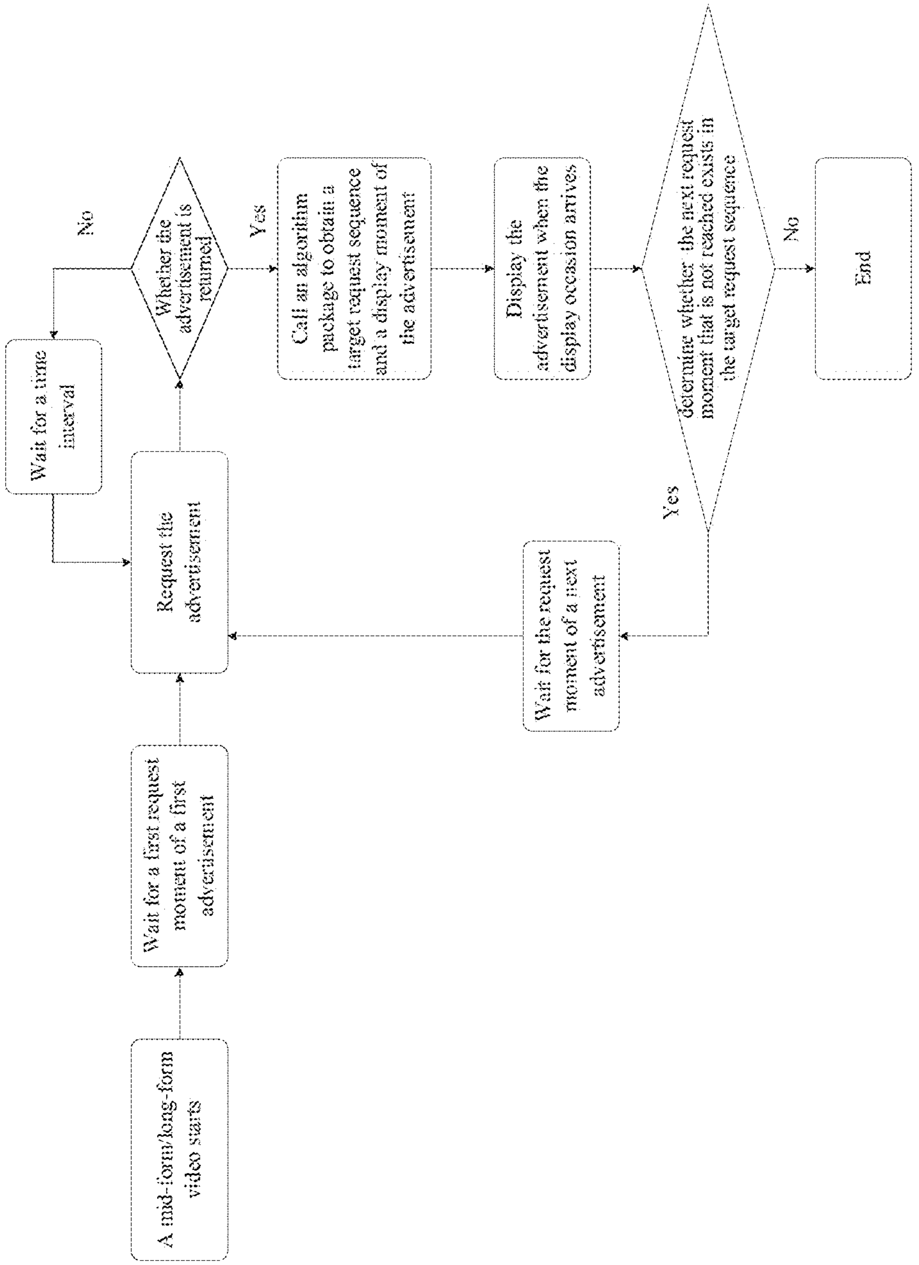
FIG. 7 is a flowchart of an insertion method according to an exemplary embodiment of the present disclosure.

FIG. 7 is a flowchart of an insertion method according to an exemplary embodiment of the present disclosure. Referring to FIG. 7, after a mid-form/long-form video starts to play, waiting for whether the first request moment of the first advertisement is reached, where the first request moment of the first advertisement may usually be configured as a moment at which the mid-form/long video has been played for a specific duration. A data request is sent to request the advertisement when the first request moment of the first advertisement is reached. It is determined whether the advertisement is returned. If no advertisement is returned, the data request is sent again to request the advertisement after a time interval, where the time interval is equivalent to the first preset duration as described above. After the advertisement is returned, an algorithm package is called to obtain a target request sequence and a display moment of the advertisement. The advertisement is displayed when the display moment arrives. It is determined whether a next request moment exists in the target request sequence, and the next request moment is a moment that is not yet reached and used for requesting the next advertisement. If so, the process returns to resending the data request to request the next advertisement when it is determined that the request moment arrives in the process of playing the target media file; if no next request moment exists in the target request sequence, no further advertisement needs to be requested in the subsequent process of playing the mid-form/long-form video.

Figure 8:
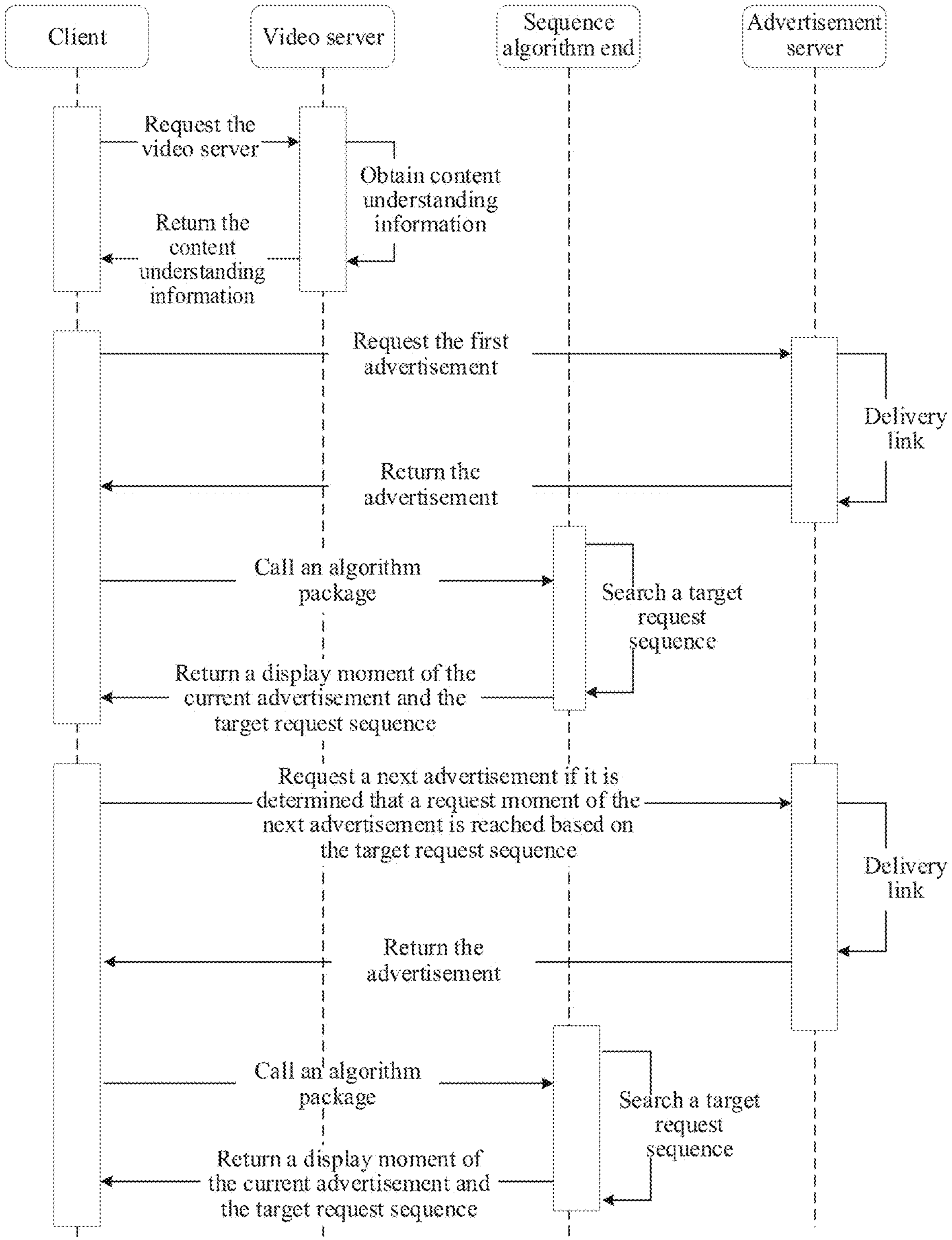
FIG. 8 is an interaction diagram of an insertion method based on the system shown in FIG. 1 according to an exemplary embodiment of the present disclosure.

FIG. 8 is an interaction diagram of an insertion method based on the system shown in FIG. 1 according to an exemplary embodiment of the present disclosure. Referring to FIG. 8, the client requests the content understanding information from the video server, and the video server may obtain the content understanding information related to the video from an article server and return the content understanding information to the client. When the request moment of the first advertisement arrives, the client requests the advertisement from the advertisement server, and the advertisement server returns the advertisement to the client through a delivery link. The client calls the algorithm package with the delivered advertisement, the content understanding information, and the above-mentioned empirical value, such that the sequence algorithm end searches the target request sequence. The sequence algorithm end returns the display moment of the current advertisement and the target request sequence. The client requests the advertisement from the advertisement server if it is determined that the request moment of the next advertisement arrives based on the target request sequence. The advertisement server returns the advertisement to the client through the delivery link. The sequence algorithm end returns the display moment of the current advertisement and the target request sequence, and the above process is repeated, until there is no request moment for a next advertisement in the target request sequence returned by the sequence algorithm end.

Figure 9:
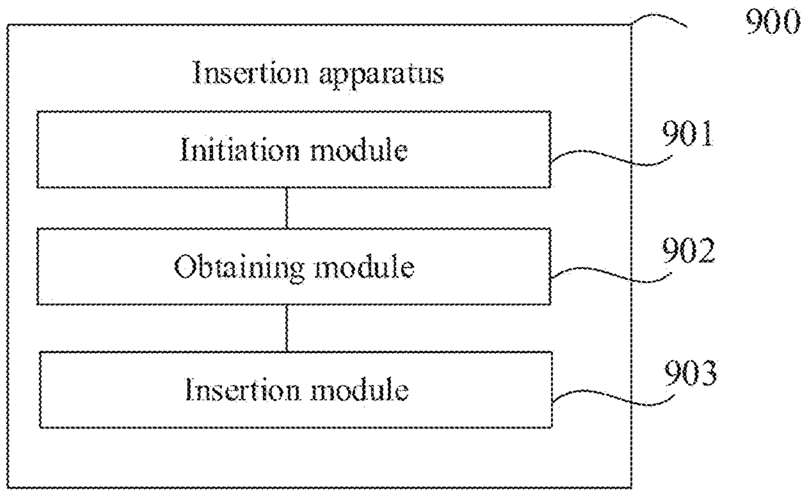
FIG. 9 is a block diagram of an insertion apparatus according to an exemplary embodiment of the present disclosure.

FIG. 9 is a block diagram of an insertion apparatus according to an exemplary embodiment of the present disclosure. Referring to FIG. 9, the insertion apparatus 900 includes:

an initiation module 901 configured to a data request in response to determining that a request moment is reached in a process of playing a target media file, wherein the data request is used for obtaining a target promotion file;

an obtaining module 902 configured to obtain a target request sequence and a display moment of the target promotion file in response to the target promotion file being successfully obtained, wherein the target request sequence includes a plurality of target moments arranged in time order, the plurality of target moments include a first target moment and a second target moment, the first target moment is used for representing a request moment at which the target promotion file is successfully requested, the second target moment is used for representing an estimated request moment for requesting other target promotion file for the first time after the target promotion file is successfully obtained this time, and the target request sequence is a candidate sequence with a highest promotional value among at least one candidate sequence that satisfies a user experience constraint; and an insertion module 903 configured to insert and play the target promotion file in the process of playing the target media file based on the display moment of the target promotion file.

In some embodiments, the obtaining module 902 includes:

a generation submodule, configured to the at least one candidate sequence that satisfies the user experience constraint, with each candidate sequence comprising at least the first target moment, wherein the user experience constraint comprises that a time difference between any two initial candidate moments in a candidate sequence is greater than a first preset difference, and/or that a difference between the first unreached second target moment in the candidate sequence and the display moment is greater than a second preset difference;

a first determining submodule, configured to determine a promotional value of each candidate sequence; and a second determining submodule configured to determine the candidate sequence with the highest promotional value as the target request sequence.

In some embodiments, the generation submodule is specifically configured to:

generate a plurality of initial candidate moments, where the plurality of initial candidate moments include at least the first target moment; determine a search range in the plurality of initial candidate moments according to a filtering rule, with the remaining initial candidate moments after filtering including at least the first target moment; and search for the at least one candidate sequence that satisfies the user experience constraint in the search range, with each candidate sequence including at least the first target moment.

In some embodiments, the filtering rule includes a first filtering rule and/or a second filtering rule, the first filtering rule is used for representing filtering out an initial candidate moment of which a first attribute value does not satisfy a corresponding condition, and the second filtering rule is used for representing filtering out any initial candidate moment in a target initial candidate moment pair, where two adjacent initial candidate moments with a time interval less than a third preset difference are the target initial candidate moment pair.

In some embodiments, the second determining submodule is specifically configured to: obtain a second attribute value corresponding to each initial candidate moment in each candidate sequence; and determine a promotional value corresponding to each candidate sequence based on the second attribute value corresponding to each initial candidate moment in each candidate sequence.

In some embodiments, the second attribute value includes at least one selected from the group consisting of an effective cost per mille, an interruption rate of ending the playback of the target media file caused by inserting the target promotion file corresponding to the initial candidate moment, a probability value of the target media file being played to the initial candidate moment, and content understanding information.

In some embodiments, the request moment includes a first request moment and a second request moment, the first request moment is a first request moment for requesting each target promotion file, the second request moment is a moment that occurs every first preset duration with the first request moment as a start moment, and the initiation module 901 is specifically configured to: initiate the data request in response to determining that the request moment is reached; and initiate the data request in response to arriving at the second request moment and the target promotion file being still not successfully obtained, until the target promotion file is successfully requested and obtained.

Reference can be made to the related embodiments as described above for implementations of the modules in the insertion apparatus 900 described above, which are not repeated herein in this embodiment.

An embodiment of the present disclosure further provides a computer-readable medium having a computer program stored thereon, where the program, when executed by a processing apparatus, causes the steps of the above insertion method to be implemented.

An embodiment of the present disclosure further provides an electronic device. The electronic device includes:

a storage apparatus having a computer program stored thereon; and a processing apparatus configured to execute the computer program in the storage apparatus to implement the steps of the above insertion method.

Figure 10:
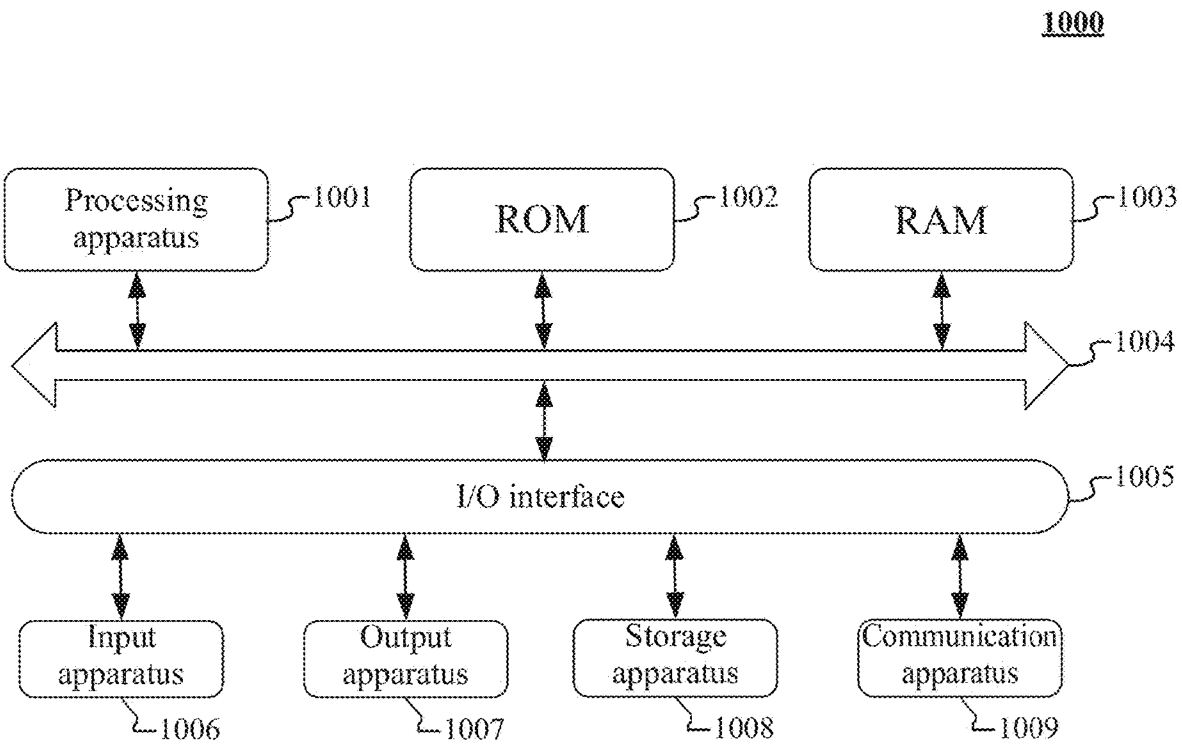
FIG. 10 is a schematic diagram of a structure of an electronic device according to an exemplary embodiment of the present disclosure.

Reference is made to FIG. 10 below, which shows a schematic diagram of the structure of an electronic device (for example, the client in FIG. 1) 1000 suitable for implementing an embodiment of the present disclosure. The terminal device in this embodiment of the present disclosure may include but is not limited to, a mobile terminal such as a mobile phone, a notebook computer, a digital broadcast receiver, a personal digital assistant (PDA), a tablet computer (PAD), a portable multimedia player (PMP), or a vehicle-mounted terminal (e.g., a vehicle navigation terminal), and a fixed terminal such as a digital TV or a desktop computer. The electronic device shown in FIG. 10 is merely an example, and shall not impose any limitation on the function and scope of use of the embodiments of the present disclosure.

As shown in FIG. 10, the electronic device 1000 may include a processing apparatus (e.g., a central processing unit or a graphics processing unit) 1001 that may perform a variety of appropriate actions and processing in accordance with a program stored in a read-only memory (ROM) 1002 or a program loaded from a storage apparatus 1008 into a random access memory (RAM) 1003. The RAM 1003 further stores various programs and data required for the operation of the electronic device 1000. The processing apparatus 1001, the ROM 1002, and the RAM 1003 are connected to each other through a bus 1004. An input/output (I/O) interface 1005 is also connected to the bus 1004.

Generally, the following apparatuses may be connected to the I/O interface 1005: an input apparatus 1006 including, for example, a touchscreen, a touchpad, a keyboard, a mouse, a camera, a microphone, an accelerometer, and a gyroscope; an output apparatus 1007 including, for example, a liquid crystal display (LCD), a speaker, and a vibrator; the storage apparatus 1008 including, for example, a tape and a hard disk; and a communication apparatus 1009. The communication apparatus 1009 may allow the electronic device 1000 to perform wireless or wired communication with other devices to exchange data. Although FIG. 10 shows the electronic device 1000 having various apparatuses, it should be understood that it is not required to implement or have all of the shown apparatuses. It may be an alternative to implement or have more or fewer apparatuses.

In particular, according to an embodiment of the present disclosure, the process described above with reference to the flowcharts may be implemented as a computer software program. For example, this embodiment of the present disclosure includes a computer program product, which includes a computer program carried on a non-transitory computer-readable medium, where the computer program includes program code for performing the method shown in the flowcharts. In such an embodiment, the computer program may be downloaded from a network through the communication apparatus 1009 and installed, installed from the storage apparatus 1008, or installed from the ROM 1002. When the computer program is executed by the processing apparatus 1001, the above-mentioned functions defined in the method of the embodiment of the present disclosure are performed.

It should be noted that the above computer-readable medium described in the present disclosure may be a computer-readable signal medium, a computer-readable storage medium, or any combination thereof. The computer-readable storage medium may be, for example, but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM) (or a flash memory), an optical fiber, a portable compact disc read-only memory (CD-ROM), an optical storage device, a magnetic storage device, or any suitable combination thereof. In the present disclosure, the computer-readable storage medium may be any tangible medium containing or storing a program that may be used by or in combination with an instruction execution system, apparatus, or device. In the present disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. The program code contained in the computer-readable medium may be transmitted by any suitable medium, including but not limited to: electric wires, optical cables, radio frequency (RF), etc., or any suitable combination thereof.

In some implementations, the electronic device may communicate using any currently known or future-developed network protocol such as a Hypertext Transfer Protocol (HTTP), and may be connected to digital data communication (for example, a communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The above computer-readable medium may be contained in the above electronic device. Alternatively, the computer-readable medium may exist independently, without being assembled into the electronic device.

The above computer-readable medium carries one or more programs that, when executed by the electronic device, cause the electronic device to: initiate a data request in response to determining that a request moment is reached in a process of playing a target media file, wherein the data request is used for obtaining a target promotion file; obtain a target request sequence and a display moment of the target promotion file in response to the target promotion file being successfully obtained, wherein the target request sequence comprises a plurality of target moments arranged in time order, the plurality of target moments comprise a first target moment and a second target moment, the first target moment is used for representing a request moment at which the target promotion file is successfully requested, the second target moment is used for representing an estimated request moment for requesting other target promotion file for the first time after the target promotion file is successfully obtained this time, and the target request sequence is a candidate sequence with a highest promotional value among at least one candidate sequence that satisfies a user experience constraint; insert and play the target promotion file in the process of playing the target media file based on the display moment of the target promotion file.

The computer program code for performing the operations of the present disclosure may be written in one or more programming languages or a combination thereof, where the programming languages include, but are not limited to, an object-oriented programming language, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the case of the remote computer, the remote computer may be connected to the computer of the user through any kind of network, including a local area network (LAN) or a wide area network (WAN), or may be connected to an external computer (for example, connected through the Internet with the aid of an Internet service provider).

The flowcharts and block diagram in the accompanying drawings illustrate the possibly implemented architecture, functions, and operations of the system, method, and computer program product according to various embodiments of the present disclosure. In this regard, each block in the flowcharts or the block diagram may represent a module, program segment, or part of code, and the module, program segment, or part of code contains one or more executable instructions for implementing the specified logical functions. It should also be noted that, in some alternative implementations, the functions marked in the blocks may also occur in an order different from that marked in the accompanying drawings. For example, two blocks shown in succession can actually be performed substantially in parallel, or they can sometimes be performed in the reverse order, depending on the functions involved. It should also be noted that each block in the block diagram and/or the flowcharts, and a combination of the blocks in the block diagram and/or the flowcharts may be implemented by a dedicated hardware-based system that executes specified functions or operations, or may be implemented by a combination of dedicated hardware and computer instructions.

The modules described in the embodiments of the present disclosure may be implemented by software, or may be implemented by hardware. The names of the modules in a certain scenario do not constitute a limitation on the modules themselves.

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system-on-chip (SOC), a complex programmable logic device (CPLD), and the like.

In the context of the present disclosure, a machine-readable medium may be a tangible medium that may contain or store a program used by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM) (or a flash memory), an optic fiber, a portable compact disc read-only memory (CD-ROM), an optical storage device, a magnetic storage device, or any suitable combination thereof.

The foregoing descriptions are merely preferred embodiments of the present disclosure and explanations of the applied technical principles. Those skilled in the art should understand that the scope of disclosure involved in the present disclosure is not limited to the technical solutions formed by specific combinations of the foregoing technical features, and shall also cover other technical solutions formed by any combination of the foregoing technical features or equivalent features thereof without departing from the foregoing concept of disclosure. For example, a technical solution formed by a replacement of the foregoing features with technical features with similar functions disclosed in the present disclosure (but not limited thereto) also falls within the scope of the present disclosure.

In addition, although the various operations are depicted in a specific order, it should not be construed as requiring these operations to be performed in the specific order shown or in a sequential order. Under certain circumstances, multitasking and parallel processing may be advantageous. Similarly, although several specific implementation details are included in the foregoing discussions, these details should not be construed as limiting the scope of the present disclosure. Some features that are described in the context of separate embodiments can also be implemented in combination in a single embodiment. In contrast, various features described in the context of a single embodiment may alternatively be implemented in a plurality of embodiments individually or in any suitable sub combination.

Although the subject matter has been described in a language specific to structural features and/or logical actions of the method, it should be understood that the subject matter defined in the appended claims is not necessarily limited to the specific features or actions described above. In contrast, the specific features and actions described above are merely exemplary forms of implementing the claims. With respect to the apparatus in the above embodiments, the specific manner in which each module performs an operation has been described in detail in the embodiments relating to the method, and will not be detailed herein.

The invention claimed is:

1. An insertion method, comprising:

initiating a data request in response to determining that a request moment is reached in a process of playing a first media file, wherein the data request is configured for obtaining a first promotion file;

obtaining a first request sequence and a display moment of the first promotion file in response to the first promotion file being successfully obtained, wherein the first request sequence comprises a plurality of moments arranged in time order, the plurality of moments comprise a first moment and a second moment, the first moment is configured for representing a request moment corresponding to a data request by which the first promotion file is successfully requested, the second moment is configured to represent a request moment, estimated based on the first moment, for requesting another first promotion file for a first time after the first promotion file is successfully obtained this time, and the first request sequence is a candidate sequence with a highest promotional value among at least one candidate sequence that satisfies a user experience constraint, the user experience constraint is a constraint that a time difference between two consecutive advertisements viewed by a user is greater than a preset difference; and inserting and playing the first promotion file in the process of playing the first media file based on the display moment of the first promotion file.

2. The method according to claim 1, wherein obtaining the first request sequence, comprises:

generating the at least one candidate sequence that satisfies the user experience constraint, with each candidate sequence comprising at least the first moment, wherein the user experience constraint comprises at least one selected from a group consisting of a first constraint and a second constraint, wherein the first constraint is that a time difference between any two initial candidate moments in a candidate sequence is greater than a first preset difference, and the second constraint is that a difference between a first unreached second moment in the candidate sequence and the display moment is greater than a second preset difference;

determining a promotional value of each candidate sequence; and determining the candidate sequence with the highest promotional value as the first request sequence.

3. The method according to claim 2, wherein generating the at least one candidate sequence that satisfies the user experience constraint, with each candidate sequence comprising at least the first moment, comprises:

generating a plurality of initial candidate moments, wherein the plurality of initial candidate moments comprise at least the first moment;

determining a search range in the plurality of initial candidate moments according to a filtering rule, wherein remaining initial candidate moments after filtering comprise at least the first moment; and searching for the at least one candidate sequence that satisfies the user experience constraint in the search range, with each candidate sequence comprising at least the first moment.

4. The method according to claim 3, wherein the filtering rule comprises at least one selected from a group consisting of a first filtering rule and a second filtering rule, the first filtering rule is configured for representing filtering out an initial candidate moment of which a first attribute value does not satisfy a corresponding condition, and the second filtering rule is configured for representing filtering out any initial candidate moment in an initial candidate moment pair, wherein two adjacent initial candidate moments with a time interval less than a third preset difference are the initial candidate moment pair.

5. The method according to claim 2, wherein determining the promotional value of each candidate sequence, comprises:

obtaining a second attribute value corresponding to each initial candidate moment in each candidate sequence; and determining the promotional value corresponding to each candidate sequence based on the second attribute value corresponding to each initial candidate moment in each candidate sequence.

6. The method according to claim 5, wherein the second attribute value comprises at least one selected from a group consisting of: an effective cost per mille, an interruption rate of ending playback of the first media file caused by inserting the first promotion file corresponding to the initial candidate moment, a probability value of the first media file being played to the initial candidate moment, and content understanding information.

7. The method according to claim 1, wherein the request moment comprises a first request moment and a second request moment, the first request moment is a moment for requesting each first promotion file, the second request moment is a moment at intervals of a first preset duration with the first request moment as a start moment, and initiating the data request in response to determining that the request moment is reached, comprises:

initiating the data request in response to determining that the first request moment is reached; and initiating the data request in response to arriving at the second request moment and the first promotion file being still not successfully obtained, until the first promotion file is successfully requested and obtained.

8. A non-transitory computer-readable medium having a computer program stored thereon, wherein the computer program, when executed by a processing apparatus, causes the processing apparatus to perform:

initiating a data request in response to determining that a request moment is reached in a process of playing a first media file, wherein the data request is configured for obtaining a first promotion file;

obtaining a first request sequence and a display moment of the first promotion file in response to the first promotion file being successfully obtained, wherein the first request sequence comprises a plurality of moments arranged in time order, the plurality of moments comprise a first moment and a second moment, the first moment is configured for representing a request moment corresponding to a data request by which the first promotion file is successfully requested, the second moment is configured to represent a request moment, estimated based on the first moment, for requesting another first promotion file for a first time after the first promotion file is successfully obtained this time, and the first request sequence is a candidate sequence with a highest promotional value among at least one candidate sequence that satisfies a user experience constraint, the user experience constraint is a constraint that a time difference between two consecutive advertisements viewed by a user is greater than a preset difference; and inserting and playing the first promotion file in the process of playing the first media file based on the display moment of the first promotion file.

9. An electronic device, comprising a memory and a processor:

wherein the memory is configured to store computer program instructions; and the processor is configured to execute the computer program instructions to implement:

initiating a data request in response to determining that a request moment is reached in a process of playing a first media file, wherein the data request is used for obtaining a first promotion file;

obtaining a first request sequence and a display moment of the first promotion file in response to the first promotion file being successfully obtained, wherein the first request sequence comprises a plurality of moments arranged in time order, the plurality of moments comprise a first moment and a second moment, the first moment is used for representing a request moment corresponding to a data request by which the first promotion file is successfully requested, the second moment is used to represent a request moment, estimated based on the first moment, for requesting another first promotion file for a first time after the first promotion file is successfully obtained this time, and the first request sequence is a candidate sequence with a highest promotional value among at least one candidate sequence that satisfies a user experience constraint, the user experience constraint is a constraint that a time difference between two consecutive advertisements viewed by a user is greater than a preset difference; and inserting and playing the first promotion file in the process of playing the first media file based on the display moment of the first promotion file.

10. The electronic device according to claim 9, wherein obtaining the first request sequence, comprises:

generating the at least one candidate sequence that satisfies the user experience constraint, with each candidate sequence comprising at least the first moment, wherein the user experience constraint comprises at least one selected from a group consisting of a first constraint and a second constraint, wherein the first constraint is that a time difference between any two initial candidate moments in a candidate sequence is greater than a first preset difference, and the second constraint is that a difference between a first unreached second moment in the candidate sequence and the display moment is greater than a second preset difference;

determining a promotional value of each candidate sequence; and determining the candidate sequence with the highest promotional value as the first request sequence.

11. The electronic device according to claim 10, wherein generating the at least one candidate sequence that satisfies the user experience constraint, with each candidate sequence comprising at least the first moment, comprises:

generating a plurality of initial candidate moments, wherein the plurality of initial candidate moments comprise at least the first moment;

determining a search range in the plurality of initial candidate moments according to a filtering rule, wherein remaining initial candidate moments after filtering comprise at least the first moment; and searching for the at least one candidate sequence that satisfies the user experience constraint in the search range, with each candidate sequence comprising at least the first moment.

12. The electronic device according to claim 11, wherein the filtering rule comprises at least one selected from a group consisting of a first filtering rule and a second filtering rule, the first filtering rule is configured for representing filtering out an initial candidate moment of which a first attribute value does not satisfy a corresponding condition, and the second filtering rule is configured for representing filtering out any initial candidate moment in an initial candidate moment pair, wherein two adjacent initial candidate moments with a time interval less than a third preset difference are the initial candidate moment pair.

13. The electronic device according to claim 10, wherein determining the promotional value of each candidate sequence, comprises:

obtaining a second attribute value corresponding to each initial candidate moment in each candidate sequence; and determining the promotional value corresponding to each candidate sequence based on the second attribute value corresponding to each initial candidate moment in each candidate sequence.

14. The electronic device according to claim 13, wherein the second attribute value comprises at least one selected from a group consisting of; an effective cost per mille, an interruption rate of ending playback of the first media file caused by inserting the first promotion file corresponding to the initial candidate moment, a probability value of the first media file being played to the initial candidate moment, and content understanding information.

15. The electronic device according to claim 9, wherein the request moment comprises a first request moment and a second request moment, the first request moment is a moment for requesting each first promotion file, the second request moment is a moment at intervals of a first preset duration with the first request moment as a start moment, and initiating the data request in response to determining that the request moment is reached, comprises:

initiating the data request in response to determining that the first request moment is reached; and initiating the data request in response to arriving at the second request moment and the first promotion file being still not successfully obtained, until the first promotion file is successfully requested and obtained.

* * * * *